(12) United States Patent
Spooner et al.

(10) Patent No.: US 10,704,683 B2
(45) Date of Patent: Jul. 7, 2020

(54) GEAR SELECTOR

(71) Applicant: JAGUAR LAND ROVER LIMITED, Warwickshire (GB)

(72) Inventors: John Spooner, Coventry (GB); Russell Osborn, Coventry (GB); Steve Mullane, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 580 days.

(21) Appl. No.: 15/329,094

(22) PCT Filed: Jul. 31, 2015

(86) PCT No.: PCT/EP2015/067680
§ 371 (c)(1),
(2) Date: Jan. 25, 2017

(87) PCT Pub. No.: WO2016/016434
PCT Pub. Date: Feb. 4, 2016

(65) Prior Publication Data
US 2017/0211692 A1 Jul. 27, 2017

(30) Foreign Application Priority Data

Jul. 31, 2014 (GB) .................................. 1413594.1

(51) Int. Cl.
*F16H 61/18* (2006.01)
*F16H 59/04* (2006.01)
(Continued)

(52) U.S. Cl.
CPC ............ *F16H 61/18* (2013.01); *F16H 59/04* (2013.01); *F16H 61/22* (2013.01); *F16H 61/24* (2013.01);
(Continued)

(58) Field of Classification Search
CPC .................. B25J 19/0029; F16H 61/24; F16H 2061/242; F16H 2061/243;
(Continued)

(56) References Cited

U.S. PATENT DOCUMENTS 4,754,665 A * 7/1988 Vandervoort ........... F16H 3/095
74/745
4,974,468 A * 12/1990 Reynolds ................ F16H 63/34
74/473.19

(Continued)

FOREIGN PATENT DOCUMENTS

EP 1555462 A1 7/2005
GB 1583901 2/1981
(Continued)

OTHER PUBLICATIONS

Combined Search and Examination Report under Sections 17 and 18(3) for Application No. GB1413594.1 dated Jan. 21, 215.
(Continued)

*Primary Examiner* — Victor L MacArthur
(74) *Attorney, Agent, or Firm* — Carlson, Gaskey & Olds

(57) ABSTRACT

A gear selector comprising a gate pattern and a gear lever arranged to be moveable within the gate pattern, the gate pattern comprising: a high range gate sub-pattern comprising one or more high range gear planes for moving the gear lever into to select a high range gear; a low range gate sub-pattern comprising one or more low range gear planes for moving the gear lever into to select a low range gear; a neutral plane extending transversely with respect to the high and low range gear planes; and a force profile arranged to urge the gear lever when in the neutral plane toward a resting position in one of the one or more high range gear planes, the force profile comprising a first interference arranged to divide the high range gate sub-pattern from the low range gate sub-pattern, wherein the gear lever is moveable past the
(Continued)

first interference from the high range gate sub-pattern to the low range gate sub-pattern when a first predefined action is performed by an operator moving the gear lever.

16 Claims, 7 Drawing Sheets

(51) Int. Cl.
*F16H 61/22* (2006.01)
*F16H 61/24* (2006.01)
*F16H 61/70* (2006.01)
*F16H 63/42* (2006.01)
*F16H 59/02* (2006.01)

(52) U.S. Cl.
CPC .......... *F16H 61/702* (2013.01); *F16H 63/42* (2013.01); *F16H 2059/0295* (2013.01); *F16H 2061/242* (2013.01); *F16H 2061/245* (2013.01)

(58) Field of Classification Search
CPC ......... F16H 2061/244; F16H 2061/245; F16H 2061/246; F16H 2061/247
See application file for complete search history.

(56) References Cited

U.S. PATENT DOCUMENTS

| | | | | |
|---|---|---|---|---|
| 5,370,013 A * | 12/1994 | Reynolds | ............... | F16H 3/095 74/330 |
| 5,390,561 A * | 2/1995 | Stine | ............... | F16H 3/095 74/331 |
| 5,651,292 A * | 7/1997 | Genise | ............... | F16H 3/095 74/745 |
| 5,911,787 A * | 6/1999 | Walker | ............... | F16H 61/702 701/51 |
| 6,257,082 B1 * | 7/2001 | Ore | ............... | F16H 61/16 477/79 |
| 6,301,537 B1 * | 10/2001 | Walker | ............... | F16H 59/70 701/51 |
| 6,327,529 B1 * | 12/2001 | Ore | ............... | F16H 61/702 701/51 |
| 6,364,810 B1 * | 4/2002 | Hughes | ............... | F16H 61/0248 477/124 |
| 6,520,040 B2 * | 2/2003 | Cox | ............... | F16H 61/702 74/336 R |
| 8,789,433 B2 * | 7/2014 | Jerwick | ............... | F16H 3/091 74/329 |
| 2013/0327173 A1 | 12/2013 | Iwata | | |

FOREIGN PATENT DOCUMENTS

| | | |
|---|---|---|
| JP | H09152022 A | 6/1997 |
| JP | H09324855 A | 12/1997 |
| JP | 2009127856 A | 6/2009 |
| JP | 2011207452 A | 10/2011 |

OTHER PUBLICATIONS

International Search Report and Written Opinion of the International Searching Authority for International application No. PCT/EP2015/067680 dated Oct. 9, 2015.

Combined Search and Examination Report under Sections 17 and 18(3) for Application No. GB1513539.5 dated Feb. 5, 2016.

* cited by examiner

GEAR SELECTOR

TECHNICAL FIELD

The present invention relates to a gear selector. In particular, but not exclusively, the present invention relates to a gear selector for a motor vehicle transmission. Aspects of the invention relate to a gear selector and a motor vehicle.

BACKGROUND

Motor vehicle transmission systems transfer drive from a motor to wheels of the vehicle. Off-road vehicles, for example, often feature high and low range transmissions typically consisting of a first gearbox arranged to provide several gear ratios and a second gearbox arranged to provide two gear ranges. Combination of the first and second gearboxes provides a first and second set of gear ratios each being high or low range relative to the other. Control of such transmissions is typically provided by two selectors. A first selector may be, for example, a conventional gear lever arranged to select one of the several gear ratios in the first gearbox. In this way the first gear box is equivalent to a gearbox in a vehicle without high and low ranges. A second selector may be, for example, a switch to select one of the two ranges in the second gearbox. The switch might, for example, be labelled "high/low range".

In operation, a driver of a vehicle having a high and low range transmission has to operate the two selectors to move between high and low ranges. This can be problematic when, for example the first gearbox is in a second ratio gear and the second gearbox is in a low range gear, and the driver wishes to change to the first gearbox being in a first ratio gear and the second gearbox being in a high range gear. To complete such a change while the vehicle is in motion, the driver must operate the two selectors to change gear, in any order, in each of the first and second gearboxes. An interim period between changing gear in each gearbox results in the combined transmission being either a first ratio gear in the first gearbox and a low range gear in the second gearbox, or a second ratio gear in the first gearbox and a high range gear in the second gearbox. In these interim scenarios, the combined ratio is lower than the original ratio or higher than the desired ratio respectively, and thus may cause the vehicle to jump. Accordingly, vehicles having high and low range transmissions are usually restricted to allowing change of the second gearbox gearing only when the vehicle is stationary. This is not desirable in scenarios where the driver wishes to move from low to high ranges smoothly, such as when driving from a field to a road, or when towing a trailer carrying a boat, for example, from a lake onto a road. In the latter example the driver has to stop the vehicle once the trailer is removed from the lake in order to change range to an appropriate range for road driving.

SUMMARY OF THE INVENTION

Aspects of the invention relate to a gear selector and a motor vehicle as claimed in the appended claims.

In an aspect of the invention there is provided a gear selector comprising a gate pattern and a gear lever arranged to be moveable within the gate pattern by an operator, the gate pattern comprising:
  a high range gate sub-pattern comprising one or more high range gear planes, wherein the gear lever is positionable in one of the one or more high range gear planes to select a high range gear;
  a low range gate sub-pattern comprising one or more low range gear planes, wherein the gear lever is positionable in one of the one or more low range gear planes to select a low range gear;
  a neutral plane extending transversely with respect to the high and low range gear planes;
  a biasing means arranged to urge the gear lever when in the neutral plane toward a resting position, wherein the resting position is in the neutral plane and one of the one or more high range gear planes, and wherein the gear lever is moveable by the operator against the biasing means through application of a predetermined force to the gear lever; and
  a first interference arranged to divide the high range gate sub-pattern from the low range gate sub-pattern, wherein the gear lever is moveable within the neutral plane past the first interference from the high range gate sub-pattern to the low range gate sub-pattern when a first predefined action is performed by the operator.

In an aspect of the invention there is provided a gear selector comprising a gate pattern and a gear lever arranged to be moveable within the gate pattern, the gate pattern comprising:
  a high range gate sub-pattern comprising one or more high range gear planes for moving the gear lever into to select a high range gear;
  a low range gate sub-pattern comprising one or more low range gear planes for moving the gear lever into to select a low range gear;
  a neutral plane extending transversely with respect to the high and low range gear planes; and
  a force profile arranged to urge the gear lever when in the neutral plane toward a resting position in one of the one or more high range gear planes,
  the force profile comprising a first interference arranged to divide the high range gate sub-pattern from the low range gate sub-pattern, wherein the gear lever is moveable past the first interference from the high range gate sub-pattern to the low range gate sub-pattern when a first predefined action is performed by an operator moving the gear lever.

In an embodiment:
  the gate pattern comprises a reverse gate sub-pattern comprising a reverse gear plane for moving the gear lever into to select a reverse gear;
  the neutral plane extends transversely to the reverse gear plane; and
  the force profile comprises a second interference arranged to divide the high or low range gate sub-pattern from the reverse gate sub-pattern, wherein the gear lever is moveable beyond the second interference from the high or low range gate sub-pattern to the reverse gate sub-pattern when a second predefined action is performed by an operator moving the gear lever.

In an embodiment, the gear lever is moveable past the first interference from the low-range gate sub-pattern to the high range gate sub-pattern when a third predefined action is performed by an operator moving the gear lever. The third predefined action may be performed when the operator exerts a predefined force on the gear lever in a direction to urge the gear lever past the first interference toward the high range gate sub-pattern.

In an embodiment the first predefined action is performed when the operator exerts a predefined force on the gear lever in a direction to urge the gear lever past the first interference toward the low range gate sub-pattern, said predefined force being greater than the force required to move the gear selector from said resting position within said neutral plane of the high range gate sub-pattern.

In an embodiment, one gear plane is an overlapping gear plane that is a gear plane of both the high range gate sub-pattern and the low range gate sub-pattern, and wherein the first interference is positioned on an intersection of the overlapping plane and the neutral plane.

In an embodiment, the first interference is rendered ineffective to inhibit the gear lever returning to the rest position when the gear lever:
 is in the low range gate sub-pattern;
 is moved into the overlapping gear plane;
 is moved into a gear in the overlapping gear plane; and
 returns to the neutral plane.

The first interference may be rendered effective again to inhibit movement of the gear lever into the low range sub-pattern after the gear lever has returned to the high range gate sub-pattern from the low range sub-pattern.

The first interference is positioned on an intersection between one of the high range gear planes and the neutral plane, the one of the high range gear planes being adjacent to one of the low range gear planes, wherein the first interference is rendered ineffective when the gear lever is in the low range gate sub-pattern and is moved into a gear in the one of the low range gear planes.

The low range gate sub-pattern may be positioned between the high range gate sub-pattern and the reverse gate sub-pattern.

The low-range indicator may be arranged to indicate when the gear lever is in the low range gate sub-pattern.

The gear selector may comprise a gear indicator for each of the high and low range gears, wherein:
 the gear indicators for the low range gears are highlighted to an operator moving the gear lever when the gear lever is in the low range gate sub-pattern; and,
 the gear indicators for the high range gears are highlighted to the operator moving the gear lever when the gear lever is in the high range gate sub-pattern.

In an embodiment the gear indicators are highlighted using a light source.

According to an aspect of the invention there is provided a vehicle comprising a gear selector as defined above.

Advantages of the invention are that a single gear selector is provided to control movement between high and low range gears. Convention determines that in normal driving, the gear lever must adopt a standard resting position. However, during low range driving it is desirable to prevent return of the gear lever to the conventional high range position. The present invention provides a means of preventing automatic return of the gear lever to the conventional position under certain driving conditions, for example, when the driver has chosen to use low range gears.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Aspects of the invention are described below in relation to the figures, in which.

DETAILED DESCRIPTION

Figure 1:
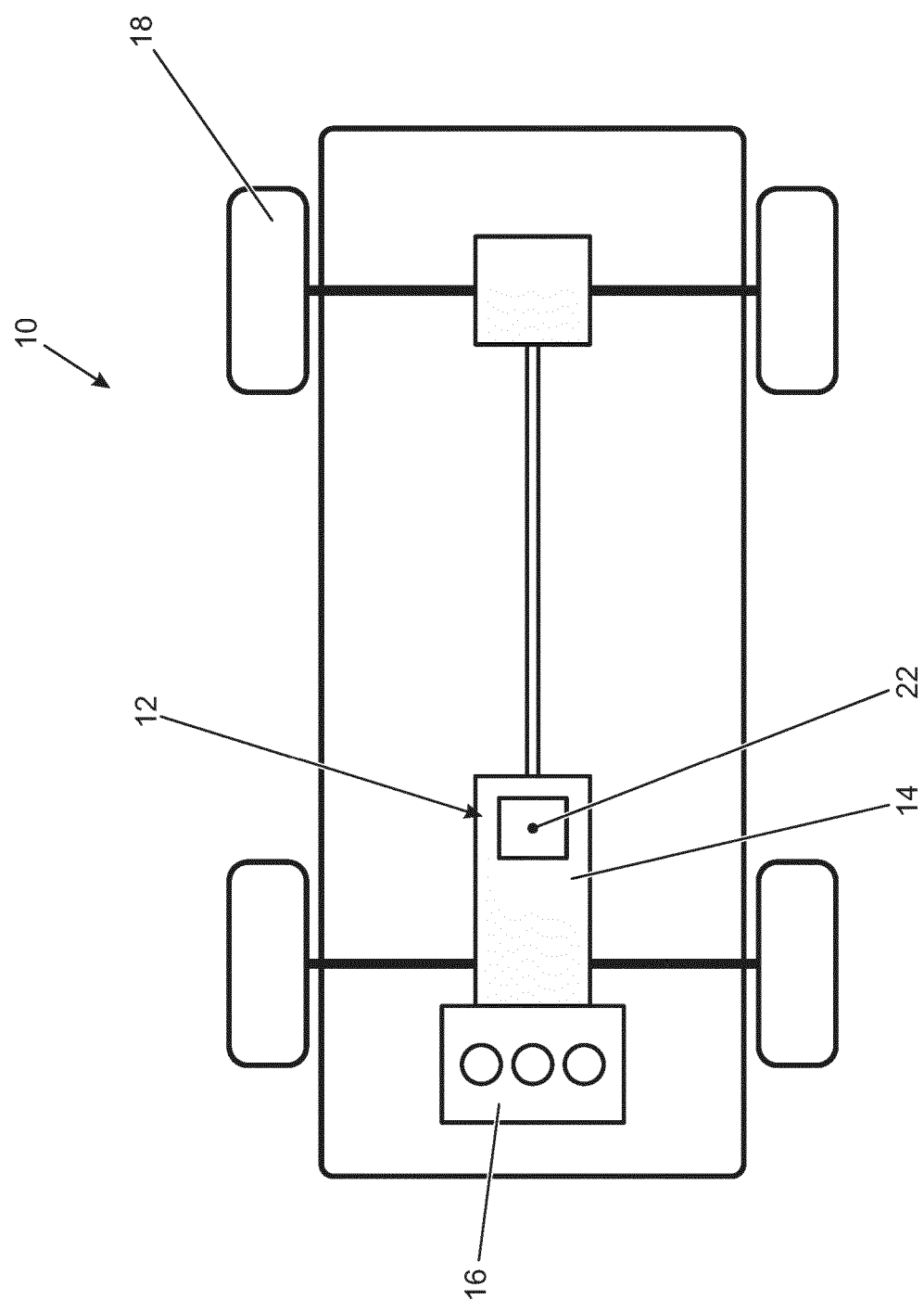
FIG. 1 shows a vehicle comprising a gear selector according to an embodiment of the present invention.

FIG. 1 shows a schematic of a vehicle 10 comprising a gear selector 12 according to an embodiment of the present invention. The gear selector is operable by a driver of the vehicle to select a gearing in a transmission 14 of the vehicle to enable motive power to be transmitted from a motor 16 through the transmission 14 to wheels 18 of the vehicle 10.

Figure 2:
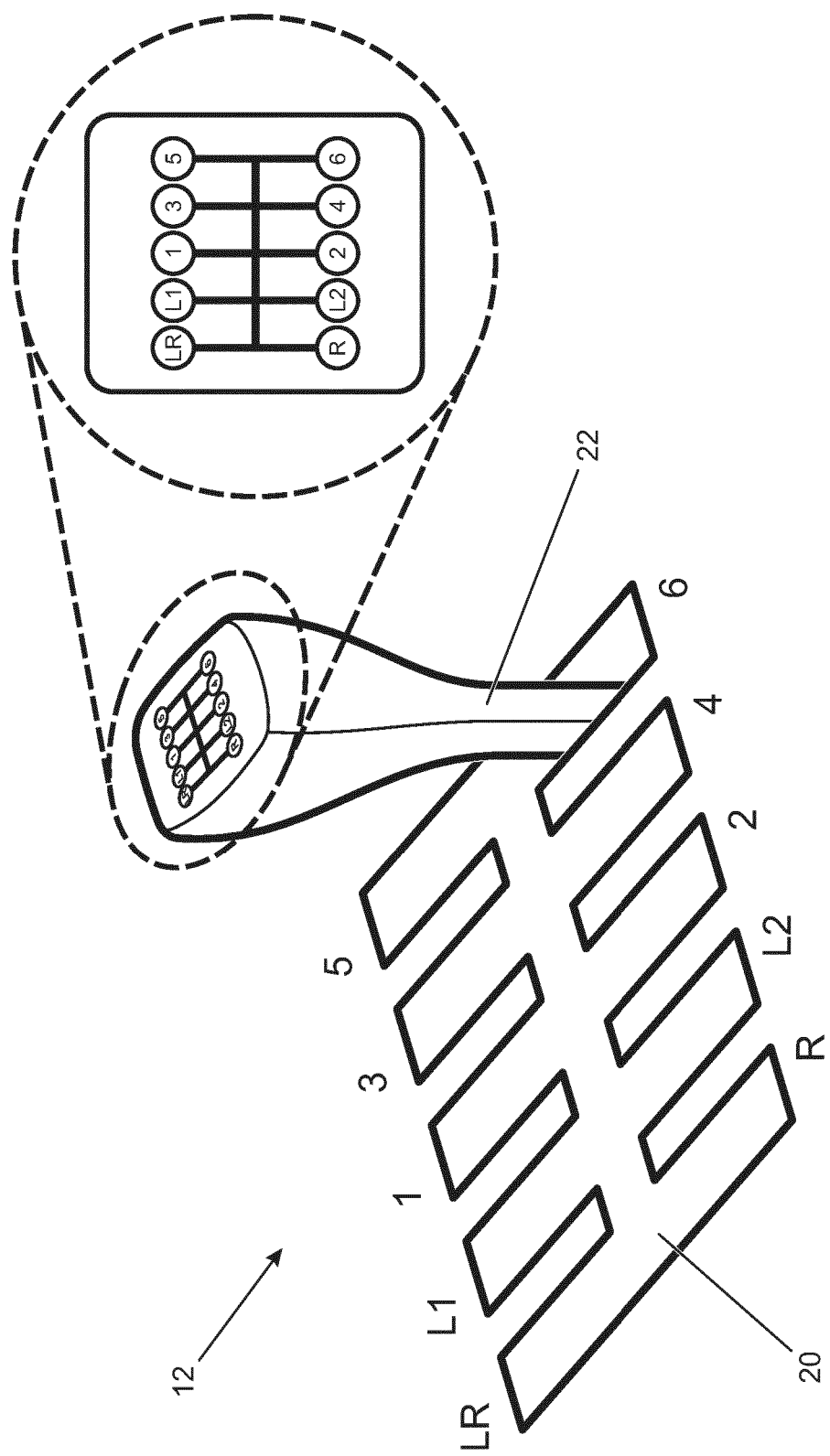
FIG. 2 shows a perspective view of a gear selector according to an embodiment of the present invention.

FIG. 2 schematically shows the gear selector 12, which comprises a gate pattern 20 and a gear lever 22. Movement of the gear lever 22 is guided by the gate pattern 20 so that gears may be selected by an operator of the lever.

Figure 3:
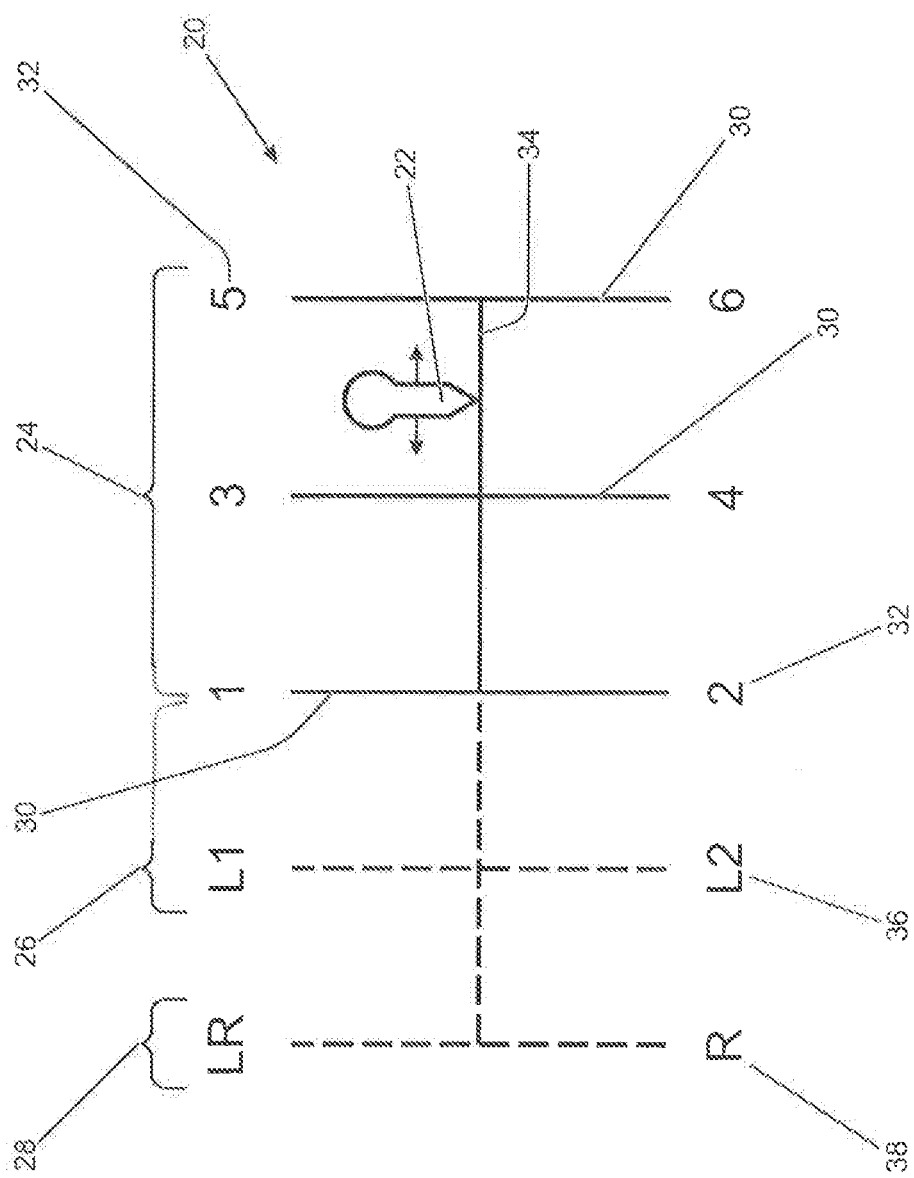
FIG. 3 shows a gate pattern of a gear selector according to an embodiment of the present invention.

The gate pattern 20, shown schematically in FIG. 3, is divided into a high range gate sub-pattern 24, a low range gate sub-pattern 26, and a reverse gate sub-pattern 28. The high range gate sub-pattern 24 provides high range gear planes 30 for moving the gear lever 22 into to select high range gears 32 which can be used to transmit power from a motive means of the vehicle to wheels of the vehicle. The gear planes are substantially perpendicular, or transverse, to a neutral gear plane 34 that, when the gear lever 22 is therein, causes the transmission to not transmit power to the wheels. The high range gears 32 can be used during "normal" driving conditions such as on-road driving, for example. In "abnormal" driving conditions such as off-road driving, for example, a driver of the vehicle may wish to select low range gears 36 provided in the low range gate sub-pattern 26. Reverse gears 38 are provided in the reverse gear sub-plane.

Figure 4:
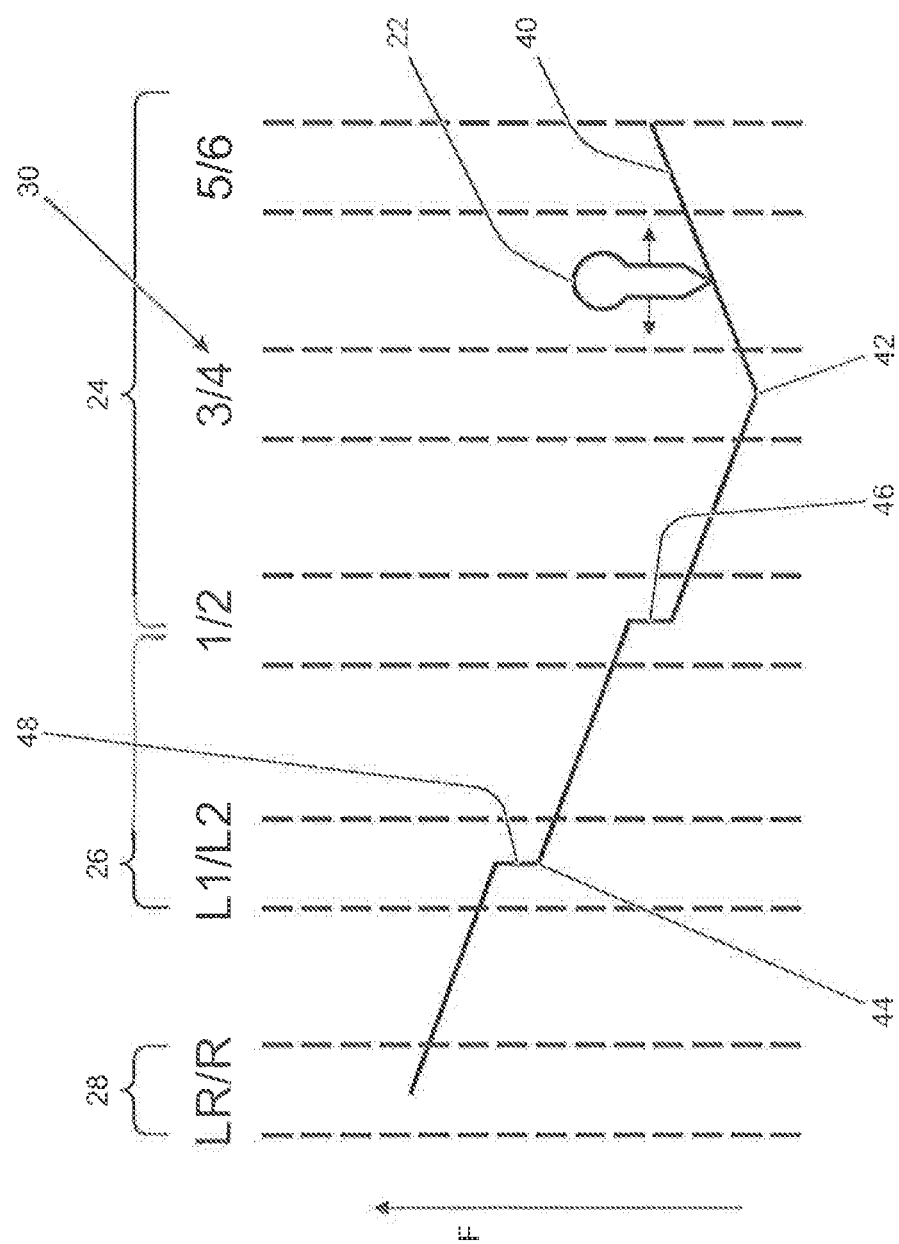
FIG. 4 shows a force profile of a gate pattern of a gear selector according to an embodiment of the present invention.

The gate pattern 20 comprises a force profile 40 as shown in FIG. 4, which illustrates varying force exerted on the gear lever 22, to urge the gear lever towards a resting position 42, depending on the position of the gear lever. For example, the force on the gear lever at a position 44 in the low range gate sub-pattern 26 is greater than the force at the resting position 42. Means to exert force on the gear lever are discussed below in relation to FIG. 8. The resting position 42 is at the 3/4 gear plane 30 as standard in conventional gearbox gate patterns.

Embodiments of the present invention further feature a first interference 46 that divides the high range gate sub-pattern 24 from the low range gate sub-pattern 26. The gear lever 22 is movable by the user within the high range gate sub-pattern 24 without having to pass the first interference 46. A second interference 48 divides the reverse gate sub-pattern 28 from the low range gate sub-pattern 26. The gear lever 22 is movable by the user within the low range gate sub-pattern to select a low range gear L1/L2 without having to pass the second interference 48.

In an example embodiment, the first interference 46 is provided by means providing an additional force urging the gear lever toward the resting plane 42. The additional means engages the gear lever only when the gear lever is moved up to and beyond the low gear plane 1/2. Similar further additional resistance means are used to provide the second interference 48. The gear lever is thus movable beyond the first and/or second interferences when the user exerts sufficiently more than a predefined force on the gear lever towards the low range gate sub-pattern, and the reverse gate sub-pattern beyond. The predefined force may also be referred to as a threshold force equal to the force exerted by the additional means. However, a similar arrangement may be provided for when the gear lever is moved towards the high range gate sub-pattern.

Figure 5:
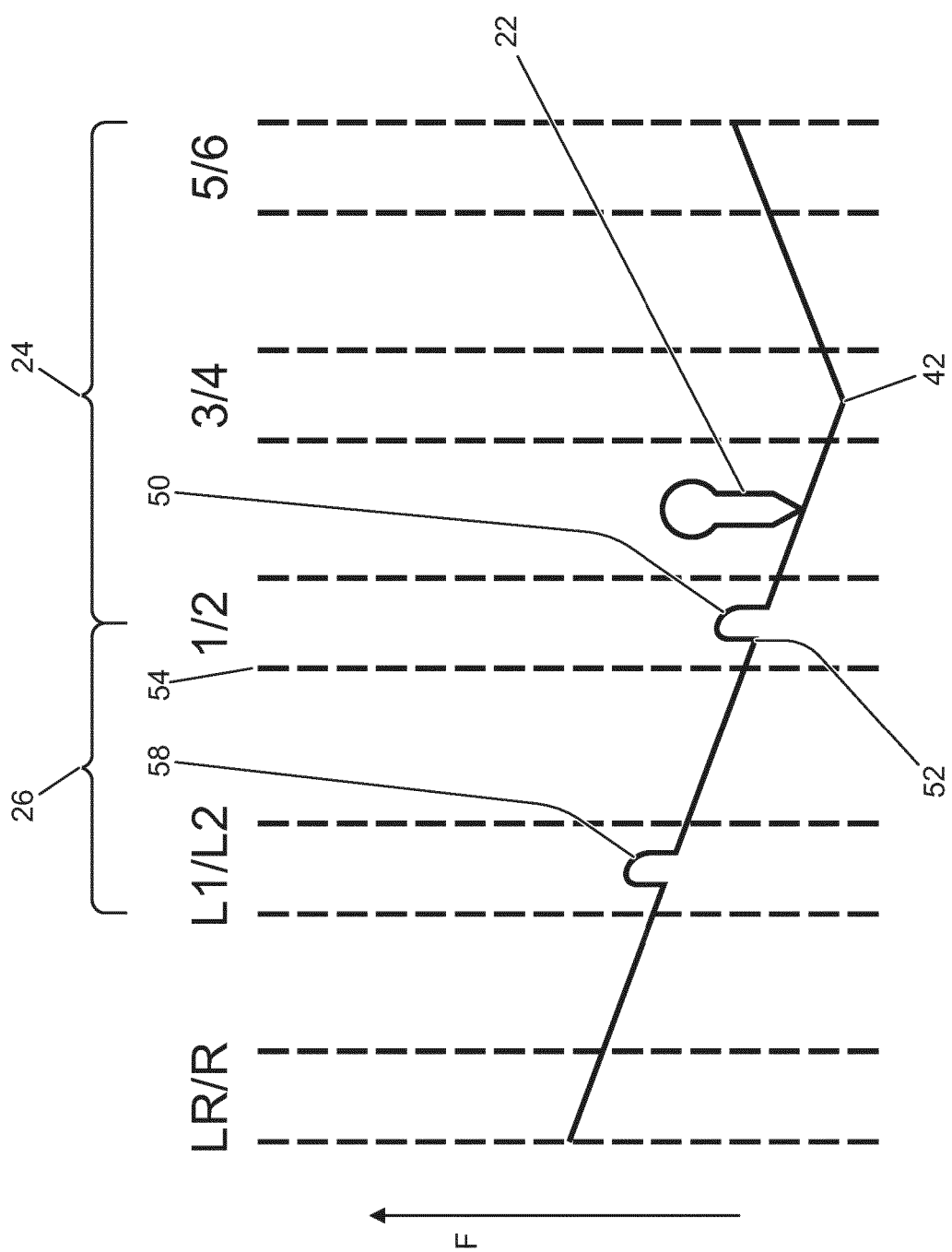
FIG. 5 shows a force profile of a gate pattern of a gear selector according to an embodiment of the present invention.

In another example embodiment the first interference is provided by a force spike 50 as shown in FIG. 5. Example systems for providing the force spike are described further below. The advantage of using a force spike is that the gear lever 22 may be moved past the force spike 50 from the high range gate sub-pattern to the low range gate sub-pattern when the user exerts a predetermined force on the gear lever in a direction towards the low range gate sub-pattern. At the point where the gear lever 22 is then in the low range gate sub-pattern, the force profile urges the gear lever toward the resting position 42 but, due to the force spike 50, rests at a low range resting position 52. The force spike 50 may be offset in the 1/2 gear plane 54 as shown in FIG. 5. This has the effect that when the gear lever is moved from the low range gate sub-pattern 26 into the 1/2 gear plane 54, return of the gear lever 22 to the neutral plane 34 (see FIG. 3) results in the gear lever being in the high range gate sub-pattern 24.

The 1/2 gear plane 54 may therefore be considered to be in the low range gate sub-pattern when the gear lever is in the low range gate sub-pattern and be considered to be in the high range gate sub-pattern when the gear lever is in the high range gate sub-pattern. Effectively, therefore, when the gear lever 22 is in the low range gate sub-pattern, the 1/2 gear plane 54 may also be termed a L3/L4 gear plane. The 1/2, L3/L4 gear plane 54 may therefore be termed an overlapping gear plane.

FIG. 5 further shows a second interference 58 at the L1/L2 plane to indicate the position of the L1/L2 plane to an operator of the gearstick. In the embodiment shown, the second interference is a force ridge and requires a predetermined force to be applied to the gear lever to be passed. In embodiments of the invention, the operator is required to lift the gear lever over the force ridge and thereby perform a predetermined action. Other embodiments require the operator to push downwards on the gear lever to overcome the second interference 58. Release of the gear lever in the LR/R plane results in the gear lever returning to the L1/L2 plane. In some embodiments, release of the gear lever from the LR gate results in the gear lever returning to and resting at the L1/L2 plane, whereas release of the gear lever from the R gate results in the gear lever returning to and resting at the 1/2 plane. This is discussed further below.

Figure 6:
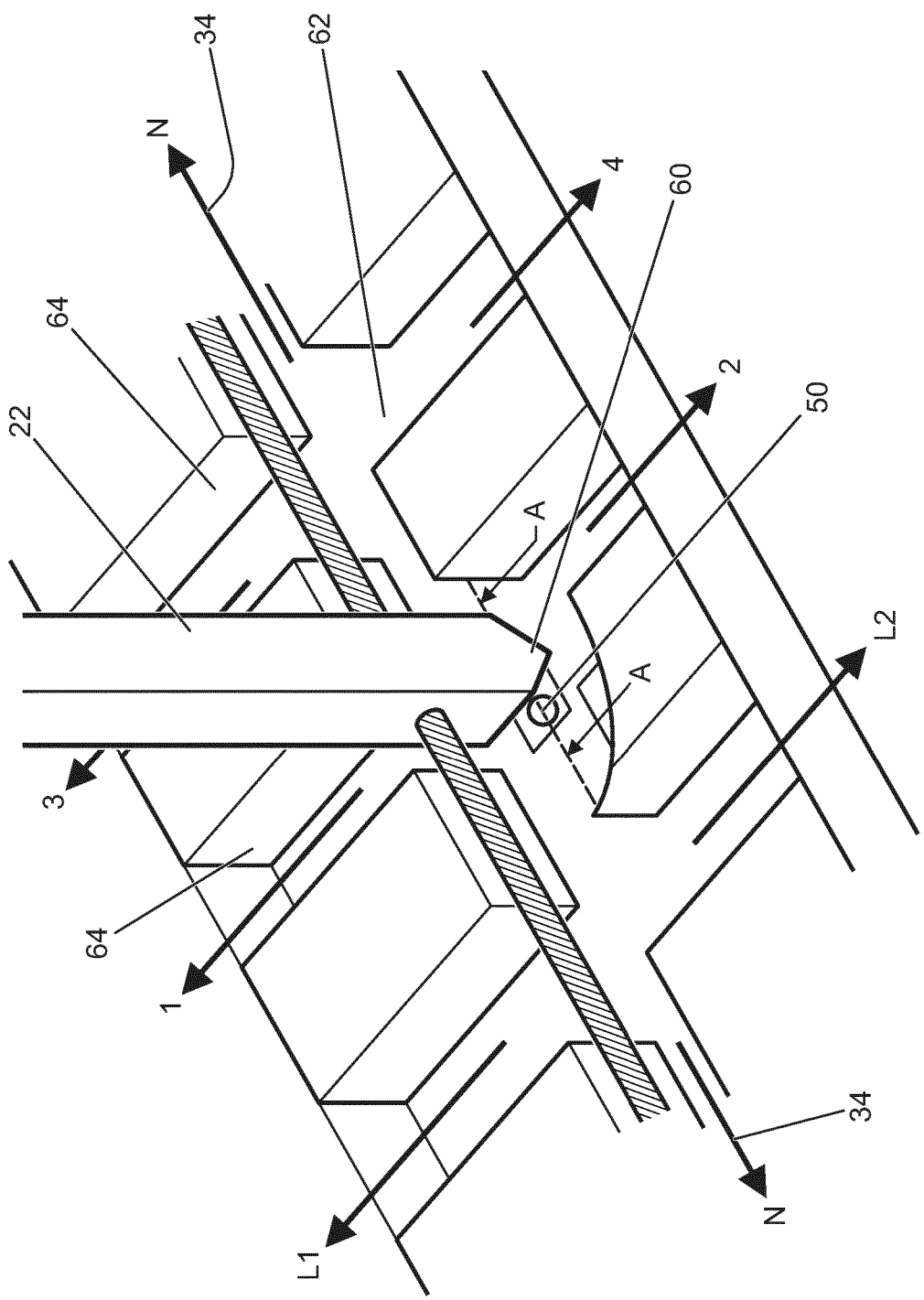
FIG. 6 shows a perspective view of a gear selector according to an embodiment of the present invention.

FIG. 6 shows the gear lever 22 as part of a gear selector according to an embodiment of the present invention where a force spike is provided in the force profile. The gear lever 22 has an end 60 that runs in a channel 62 of the gate pattern 20. The channel forms the gate pattern 20 that guides the gear lever 22. The end 60 is pointed and engages with the first interference 50 which creates the force spike. In the current example, the first interference 50 comprises a ball positioned in a well and which is spring biased, using a spring, towards the top of the well, so that the end 60 of the gear lever 22 interferes with the ball. Sides 64 of the gear planes further define the channel 62 into which the gear lever can be moved. In use, the gear lever may be moved by an operator along the neutral plane 34 in the high range gate sub-pattern up to the first interference. A predefined force applied to the gear lever in a direction toward the low range gate sub-pattern permits the gear lever to pass the first interference 50.

Figure 7:
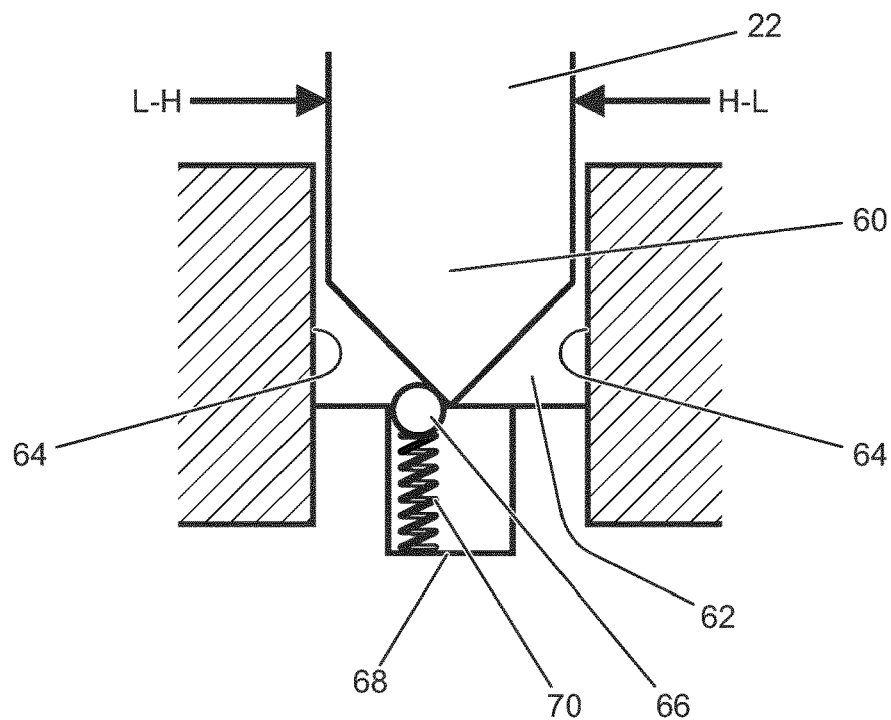
FIG. 7 shows a cross-section of the gear selector of FIG. 6 as taken through line A-A.

FIG. 7 shows a cross-sectional view through the line A-A as indicated in FIG. 6. FIG. 7 shows the gear lever 22 positioned in the 1/2 plane as defined by the sides 64. The ball 66 and well 68 of first interference, as described in relation to FIG. 6, are shown in FIG. 7. The well 68 is positioned centrally in the neutral plane between sides 64. The ball 66 is fixed to the spring 70 so that in a rest position the ball extends into the channel 62 so as to form the first interference. The spring 70 is a compression spring. Other springs, for example leaf springs, may also be used. The spring 70 urges the ball 66 toward the low range side of the well 68 so that in the rest position the gear lever 22 can be moved up to the ball 66 (indicated by the arrow H-L) and into the 1/2 gear plane see FIG. 6) without moving the ball 66. Movement into the low range gate sub-pattern is performed by the operator by moving the gear lever 22 in the neutral plane up to the ball 66 and presenting a force to the gear lever 22 in a direction toward the low range gate sub-pattern (indicated by the arrow H-L) sufficient to urge the ball 66 against the spring 70 into the well 68 so that the gear lever is then positioned in the low range gate sub-pattern. The predefined force is great enough for the operator to be aware that the ball has been urged into the well but not so great that the operator has difficulty moving the ball into the well.

Figure 8:
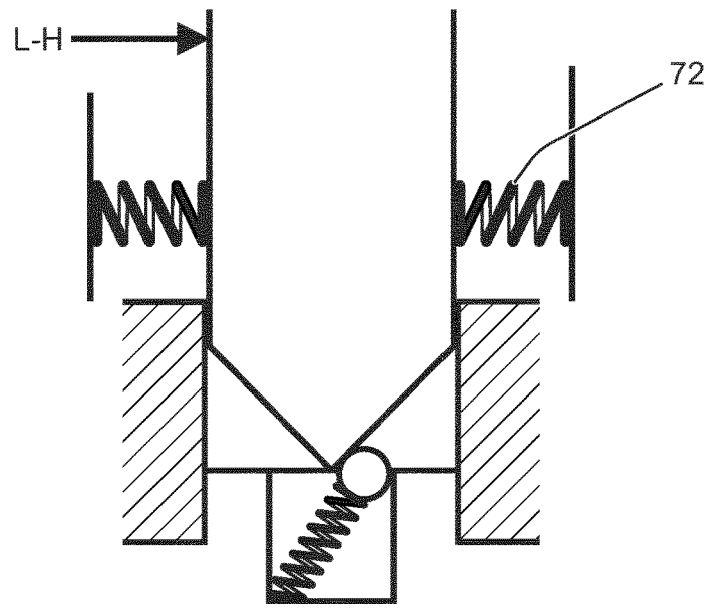
FIG. 8 shows a cross-section of the gear selector of FIG. 6 as taken through line A-A.

FIG. 8 shows the gear lever 22 of FIG. 7 positioned in the low range gate sub-pattern. In this configuration, the ball 66 is urged toward the high range gate sub-pattern by the biasing means 72 acting on the gear lever to return it to the resting position. The biasing means does not, however, supply sufficient force to urge the ball 66 into the well 68 and so the gear lever is retained against the first interference or force spike 40 in a low range resting position as described in relation to FIG. 5. Force applied to the gear lever in a direction toward the high range gate sub-pattern (indicated by the arrow L-H) urges the ball 66 into the well 68 so that the gear lever can be, and is, then positioned in the high range gate sub-pattern.

As shown in FIGS. 7 and 8, in example embodiments, the ball is biased toward a side of the well proximal to the low range gate sub-pattern. Movement of the gear lever (from the position shown in FIG. 8) into the gear plane 54, out of the neutral plane 34, causes the end 60 of the gear lever to disengage the ball 66 so that the ball returns to its resting position at the low range gate sub-pattern side of the well 68. Subsequent movement of the gear lever 22 back into the intersection of the neutral plane and the gear plane 54 results in the pointed end 60 of the gear lever 22 being on the high range gate sub-pattern side of the ball 66 and thus the gear lever 22 being positioned in the high range gate sub-pattern. Release of the gear lever in this position results in the gear lever returning to the high range gate sub-pattern resting position 42 (see FIG. 5) at the 3/4 plane.

In example gear selectors according to embodiments of the present invention, the spring 70 shown in FIGS. 6 to 8 is replaced by an activation means, such as a solenoid, for example, to form a mechanical detent to form a force spike. The solenoid activates and deactivates the ball 66 or otherwise to form the first interference as discussed above. Mechanical activation or actuation of the detent enables the detent to be activated under certain conditions. For example, the detent can be activated (raised into the path of the gear lever 22) when the gear lever 22 is in the high range gate sub-pattern. Passage of the gear lever to the low range gate sub-pattern then requires the completion of a predefined action by the operator of the gear lever. This might be, for example, providing sufficient force to the gear lever to overcome the force spike. In this example, the solenoid may resiliently bias the detent toward the path of the gear lever so that a force presented to the detent urges the solenoid toward its deactivated state. Alternatively, the gear lever could be lifted by the operator over the detent. Alternatively again, the gear lever could feature a button that, when pressed by the operator, causes the solenoid to deactivate the detent. Other alternative arrangements to pass the detent are within the scope of the present invention. For example, the detent may be operated by external factors such as a low speed of the vehicle, and/or application of the brake by the driver. The skilled person will appreciate that the examples of predefined action described here may be used as predefined actions for permitting movement past the first, second and third interferences (as described below).

In some embodiments, a solenoid and spring 70 are used in combination to form the interference so that, in one operative condition, the solenoid moves the spring 70 so that the detent or ball 66 may engage the gear lever 22 and act as shown in FIGS. 7 and 8 and described in the foregoing text. In another operative condition, the solenoid moves the spring 70 to a position where the detent or ball 66 does not contact the gear lever 22.

Further activation or deactivation of the detent may also be useful. For example, the detent may be or remain activated when the gear lever is in the low range gate sub-pattern. This embodiment is advantageous because the gear lever adopts a low range resting position as discussed above. Movement of the gear lever into the overlapping plane, for example, the 1/2 plane, may cause deactivation of the detent. Movement into the gear plane, to select a gear, may be detected using conventional means and is not discussed further herein. According to an embodiment of the present invention, the mechanical detent may be deactivated when the gear lever is moved to select 2nd gear. This is advantageous because there may be driving scenarios where a driver wishes to move up through the gears, for example L1-L2-1-2-3 . . . . In this scenario, release of the gear lever in the L1/L2 plane results in the gear lever returning to the 1/2 plane. Movement into 1st gear is subsequently performed by direct forward movement of the gear lever. The detent may then be deactivated when the gear lever is moved into 2nd gear. Subsequent release from the 1/2 plane results in the gear lever returning to the standard 3/4 plane and accordingly there is no interference to smooth transition through the gears.

As mentioned above, release of the gear lever from the LR gate results in the second interference 58 remaining engaged and the gear lever returning to and resting at the L1/L2 plane, whereas release of the gear lever from the R gate results in the second interference 58 being disengaged and the gear lever returning to and resting at the 1/2 plane. In other embodiments the first interference 50 is also disengaged on entry to or release from the R gate so that release of the gear lever from the R gate results in return of the gear lever 22 to the 3/4 plane.

It is further advantageous to deactivate the mechanical detent only on movement of the gear lever into 2nd gear because 1st gear may be used as an effective part of the low range gate sub-pattern so that a vehicle operator can move between L2 and 1, or other combinations, without the gear lever returning to the high range gate sub-pattern.

In examples according to embodiments of the present invention, mechanical detents that do not use an electronic activation means, such as a solenoid, are used. In these examples, the mechanical detents are mechanically switched by movement of the gear lever. For example, movement of the gear lever into the low range gate sub-pattern activates the detent. Subsequent movement around the low range gate sub-pattern does not deactivate the detent. However, movement of the gear lever into, for example, 2nd gear switches the detent to deactivate it. This is performed, for example, using a sliding detent that is slid to a deactivated position through certain movement of the gear lever.

Returning to FIG. 2, in examples according to embodiments of the invention, indicators are used to indicate the position of the gear lever. For example, as the gear lever 22 passes the interference and enters the low range gate sub-pattern 26, the indicator alerts the driver that the vehicle is in low range. The indicator may take many forms. For example, an LED on the dashboard of the vehicle may illuminate to indicate low range. Alternatively, or in addition, gear numbers provided on the gear lever 22 are backlit so that sets of gear numbers may be illuminated depending on the selected gate sub-pattern. For example, gears L1-L2-1-2 may be illuminated when the low range gate sub-pattern is selected and gears 1-2-3-4-5-6 illuminated when the high range gate sub-pattern is selected. Similarly, gears LR and R may be selected when the reverse gate sub-pattern is selected. Alternatively, or in addition, a notification may be presented on a driver information screen, or the like.

In examples according to embodiments of the invention, the low range reverse gear is accessible from the low range gate sub-pattern without interference. This is advantageous because, in off-road conditions, it can be desirable to move between L1 and LR to provide a rocking motion to the vehicle. This is particularly useful in muddy environments where rocking the vehicle provides sufficient traction to overcome the obstacle. In these example embodiments, the second interference is provided at the high range reverse, R, gear gate to prevent accidental movement of the gear lever into the high range reverse gear but to allow unimpeded movement into LR from L1. Accordingly, it is advantageous also to place the reverse gate sub-pattern adjacent to the low range gate sub-pattern to permit quick movement between L1 and LR. Similarly, in some embodiments, the detent or detents 50, 58 are engaged and/or disengaged to permit movement between L2 and R or 1 and R.

In example embodiments according to the present invention, a third interference is provided to divide the reverse gate sub-pattern from the low or high range. For example, where the first interference 50 is placed at the 1/2 plane and the second interference 58 is placed at the L1/L2 plane, the third interference is provided between the low range reverse gear gate LR and the high range reverse gear gate R. In some embodiments, the third interference may interfere with movement of the gear lever into the LR gear gate to prevent accidental movement into LR when high range driving is intended.

Where an electronically controlled detent is provided (for example the solenoid driven detent described above), control systems may activate and deactivate the detent under certain driving conditions. For example, the detent may be deactivated on start-up of the vehicle so that a released gear lever adopts the conventional resting position. In other examples, the detent may be deactivated when off-road conditions are detected by vehicle systems.

Aspects of the invention are defined in the following numbered paragraphs.

1. A gear selector comprising a gate pattern and a gear lever arranged to be moveable within the gate pattern, the gate pattern comprising:
  a high range gate sub-pattern comprising one or more high range gear planes for moving the gear lever into to select a high range gear;
  a low range gate sub-pattern comprising one or more low range gear planes for moving the gear lever into to select a low range gear;
  a neutral plane extending transversely with respect to the high and low range gear planes; and
  a force profile arranged to urge the gear lever when in the neutral plane toward a resting position in one of the one or more high range gear planes,
  the force profile comprising a first interference arranged to divide the high range gate sub-pattern from the low range gate sub-pattern, wherein the gear lever is moveable past the first interference from the high range gate sub-pattern to the low range gate sub-pattern when a first predefined action is performed by an operator moving the gear lever.

2. A gear selector as defined in paragraph 1 wherein:
  the gate pattern comprises a reverse gate sub-pattern comprising a reverse gear plane for moving the gear lever into to select a reverse gear;
  the neutral plane extends transversely to the reverse gear plane; and
  the force profile comprises a second interference arranged to divide the high or low range gate sub-pattern from the reverse gate sub-pattern, wherein the gear lever is moveable beyond the second interference from the high or low range gate sub-pattern to the reverse gate sub-pattern when a second predefined action is performed by an operator moving the gear lever.

3. A gear selector as defined in paragraph 1 wherein the gear lever is moveable past the first interference from the low-range gate sub-pattern to the high range gate sub-pattern when a third predefined action is performed by an operator moving the gear lever.

4. A gear selector as defined in paragraph 3 wherein the third predefined action is performed when the operator exerts a predefined force on the gear lever in a direction to urge the gear lever past the first interference toward the high range gate sub-pattern.

5. A gear selector as defined in paragraph 1 wherein the first predefined action is performed when the operator exerts a predefined force on the gear lever in a direction to urge the gear lever past the first interference toward the low range gate sub-pattern, said predefined force being greater than the force required to move the gear selector from said resting position within said neutral plane of the high range gate sub-pattern.

6. A gear selector as defined in paragraph 1 wherein one gear plane is an overlapping gear plane that is a gear plane of both the high range gate sub-pattern and the low range gate sub-pattern, and wherein the first interference is positioned on an intersection of the overlapping plane and the neutral plane.

7. A gear selector as defined in paragraph 6, wherein the first interference is rendered ineffective to inhibit the gear lever returning to the rest position when the gear lever:
  is in the low range gate sub-pattern;
  is moved into the overlapping gear plane;
  is moved into a gear in the overlapping gear plane; and
  returns to the neutral plane.

8. A gear selector as defined in paragraph 7 wherein the first interference is rendered effective again to inhibit movement of the gear lever into the low range sub-pattern after the gear lever has returned to the high range gate sub-pattern from the low range sub-pattern.

9. A gear selector as defined in paragraph 1 wherein the first interference is positioned on an intersection between one of the high range gear planes and the neutral plane, the one of the high range gear planes being adjacent to one of the low range gear planes, wherein the first interference is rendered ineffective when the gear lever is in the low range gate sub-pattern and is moved into a gear in the one of the low range gear planes.

10. A gear selector as defined in paragraph 1 wherein the first interference is positioned in the neutral plane between one of the one or more high range gear planes and one of the one or more low range gear planes.

11. A gear selector as defined in paragraph 2 wherein the low range gate sub-pattern is positioned between the high range gate sub-pattern and the reverse gate sub-pattern.

12. A gear selector as defined in paragraph 1 comprising a low-range indicator arranged to indicate when the gear lever is in the low range gate sub-pattern.

13. A gear selector as defined in paragraph 1 comprising a gear indicator for each of the high and low range gears, wherein:
  the gear indicators for the low range gears are highlighted to an operator moving the gear lever when the gear lever is in the low range gate sub-pattern; and,
  the gear indicators for the high range gears are highlighted to the operator moving the gear lever when the gear lever is in the high range gate sub-pattern.

14. A gear selector as defined in paragraph 13 wherein the gear indicators are highlighted using a light source.

15. A vehicle comprising a gear selector as defined in any of paragraphs 1 to 14.

The invention claimed is:

1. A gear selector comprising a gate pattern and a gear lever arranged to be moveable within the gate pattern by an operator, the gate pattern comprising:
  a high range gate sub-pattern comprising two or more high range gear planes, wherein the gear lever is positionable in one of the two or more high range gear planes to select a high range gear;
  a low range gate sub-pattern comprising a low range gear plane, wherein the gear lever is positionable in the low range gear plane to select a low range gear;
  a neutral plane extending transversely with respect to the gear planes;
  a biasing means arranged to urge the gear lever when in the neutral plane toward a resting position, wherein the resting position is in the neutral plane and one of the two or more high range gear planes, and wherein the gear lever is moveable by the operator against the biasing means through application of a predetermined force to the gear lever; and
  a first interference positioned in the neutral plane and arranged to divide the high range gate sub-pattern from the low range gate sub-pattern, wherein the first interference comprises an interference member and a spring, the spring urging the interference member into a first position where the interference member interferes with movement of the gear lever within the neutral plane from the high range gate sub-pattern into the low range gate sub-pattern, the spring allowing the gear lever to move within the neutral plane past the first interference from the high range gate sub-pattern to the low range gate sub-pattern when a first predefined action is performed by the operator, the spring urging the interference member into a second position where the interference member interferes with movement of the gear lever within the neutral plane from the low range gate sub-pattern into the high range gate sub-pattern subsequent to the first predefined action being performed by the operator, wherein a force of the biasing means to urge the gear lever toward the resting position is insufficient to move the gear lever past the interference member in the second position, the spring allowing the gear lever to move within the neutral plane from the low range gate sub-pattern into the high range gate sub-pattern when the operator performs a second predefined action.

2. A gear selector as claimed in claim 1, wherein:
the gate pattern comprises a reverse gate sub-pattern comprising a reverse gear plane wherein the gear lever is positionable in the reverse gear plane to select a reverse gear;
the neutral plane extends transversely to the reverse gear plane;
a second interference is arranged to divide the high or low range gate sub-pattern from the reverse gate sub-pattern; and
the gear lever is moveable within the neutral plane past the second interference from the high or low range gate sub-pattern to the reverse gate sub-pattern when a third predefined action is performed by the operator moving the gear lever.

3. A gear selector as claimed in claim 1, wherein the second predefined action comprises the operator exerting a predefined force on the gear lever in a direction to urge the gear lever past the first interference toward the high range gate sub-pattern.

4. A gear selector as claimed in claim 1, wherein the first predefined action comprises the operator exerting a predefined force on the gear lever in a direction to urge the gear lever past the first interference toward the low range gate sub-pattern, said predefined force being greater than a force required to move the gear selector from said resting position within said neutral plane of the high range gate sub-pattern against the biasing means.

5. A gear selector as claimed in claim 1, wherein the first interference is rendered ineffective to inhibit the gear lever returning to the resting position when the gear lever:
is received against the interference member on a low range gate sub-pattern side of the interference member while the interference member is in the second position;
is moved into a gear plane intersecting the neutral plane at a location of the interference member such that the spring moves the interference member from the second position into the first position; and
returns to the neutral plane.

6. A gear selector as claimed in claim 1, wherein the first interference is rendered effective again to inhibit movement of the gear lever into the low range sub-pattern after the gear lever has returned to the high range gate sub-pattern from the low range gate sub-pattern.

7. A gear selector as claimed in claim 1, wherein the first interference is positioned on an intersection between one of the high range gear planes and the neutral plane, the one of the high range gear planes being adjacent to the low range gear plane, wherein the first interference is rendered ineffective when the gear lever is in the adjacent low range gear plane and is moved into a gear in the adjacent low range gear plane.

8. A gear selector as claimed in claim 2, wherein the low range gate sub-pattern is positioned between the high range gate sub-pattern and the reverse gate sub-pattern.

9. A gear selector as claimed in claim 1, comprising a low-range indicator arranged to indicate when the gear lever is in the low range gate sub-pattern.

10. A gear selector as claimed in claim 1, comprising a gear indicator for each of the high and low range gears, wherein:
the gear indicators for the low range gears are highlighted to an operator when the gear lever is in the low range gate sub-pattern; and
the gear indicators for the high range gears are highlighted to the operator when the gear lever is in the high range gate sub-pattern.

11. A gear selector as claimed in claim 10, comprising at least one light source for highlighting the highlighted gear indicators.

12. A vehicle comprising a gear selector as claimed in claim 1.

13. A gear selector as claimed in claim 1, wherein the spring is received in a well and the interference member is at least partially outside of the well when the interference member is in the first position.

14. A gear selector as claimed in claim 13, wherein one side of the well is closer to the low range gate sub-pattern and the interference member is situated next to the one side of the well in the first position.

15. A gear selector as claimed in claim 1, wherein the interference member comprises a ball.

16. A gear selector as claimed in claim 15, wherein the ball is supported on an end of the spring.

* * * * *